(12) United States Patent
Usui et al.

(10) Patent No.: US 11,541,871 B2
(45) Date of Patent: Jan. 3, 2023

(54) DRIVE CONTROL SYSTEM FOR HYBRID VEHICLE

(71) Applicant: TOYOTA JIDOSHA KABUSHIKI KAISHA, Toyota (JP)

(72) Inventors: Kunihiko Usui, Fuji (JP); Akio Sugawara, Toyota (JP); Ryosuke Ikemura, Susono (JP); Keisuke Ushida, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 17/064,905

(22) Filed: Oct. 7, 2020

(65) Prior Publication Data

US 2021/0107450 A1    Apr. 15, 2021

(30) Foreign Application Priority Data

Oct. 15, 2019   (JP) .............................. JP2019-188436

(51) Int. Cl.
| | | |
|---|---|---|
| *B60W 20/15* | (2016.01) | |
| *B60W 10/06* | (2006.01) | |
| *B60W 10/02* | (2006.01) | |
| *B60W 10/08* | (2006.01) | |
| *B60W 30/18* | (2012.01) | |

(Continued)

(52) U.S. Cl.
CPC ............ *B60W 20/15* (2016.01); *B60W 10/02* (2013.01); *B60W 10/06* (2013.01); *B60W 10/08* (2013.01); *B60W 10/10* (2013.01); *B60W 10/18* (2013.01); *B60W 10/26* (2013.01); *B60W 20/20* (2013.01); *B60W 30/18118* (2013.01); *B60W 50/0205* (2013.01); *B60W 50/029* (2013.01)

(58) Field of Classification Search
CPC ...... B60W 20/15; B60W 10/02; B60W 10/06; B60W 10/08; B60W 10/10; B60W 10/26; B60W 20/20; B60W 50/0205; B60W 50/029

See application file for complete search history.

(56) References Cited

U.S. PATENT DOCUMENTS 6,059,064 A * 5/2000 Nagano ................. B60W 20/00
                                                      903/903
6,083,138 A * 7/2000 Aoyama ............... B60W 10/08
                                                      903/945

(Continued)

FOREIGN PATENT DOCUMENTS

| JP | H11-240351 A | 9/1999 |
|---|---|---|
| JP | 2004-266958 A | 9/2004 |

(Continued)

*Primary Examiner* — Carl C Staubach
(74) *Attorney, Agent, or Firm* — Oliff PLC (57) ABSTRACT

A drive control system for a hybrid vehicle configured to prevent backward coasting on an uphill grade even when an engine torque cannot be delivered to drive wheels. When the hybrid vehicle is propelled by delivering engine torque to rear wheels on an uphill grade, the drive control system determines an occurrence of a failure in which the torque cannot be delivered from the engine to the rear wheels. If the occurrence of the failure is determined, the drive control system executes a hill hold control to deliver torque to establish a required drive force from a motor to front wheels while disengaging an engagement device.

10 Claims, 3 Drawing Sheets

(51) Int. Cl.
*B60W 20/20* (2016.01)
*B60W 10/10* (2012.01)
*B60W 10/18* (2012.01)
*B60W 50/02* (2012.01)
*B60W 50/029* (2012.01)
*B60W 10/26* (2006.01)

(56) References Cited

U.S. PATENT DOCUMENTS

| | | | | |
|---|---|---|---|---|
| 8,335,605 | B2 * | 12/2012 | Mueller | B60W 20/13 |
| | | | | 701/22 |
| 2005/0017580 | A1 * | 1/2005 | Cikanek | B60W 20/00 |
| | | | | 303/191 |
| 2008/0153661 | A1 * | 6/2008 | Shibata | F16H 61/0437 |
| | | | | 477/3 |
| 2010/0029436 | A1 * | 2/2010 | Katsuta | B60L 58/12 |
| | | | | 180/65.23 |
| 2011/0065548 | A1 * | 3/2011 | Yu | B60W 10/11 |
| | | | | 477/203 |
| 2012/0209479 | A1 * | 8/2012 | Yanagida | B60T 7/122 |
| | | | | 701/70 |
| 2013/0296112 | A1 * | 11/2013 | Yamazaki | B60W 10/06 |
| | | | | 903/902 |
| 2016/0152152 | A1 * | 6/2016 | Gaither | B60L 50/15 |
| | | | | 701/22 |
| 2020/0101965 | A1 * | 4/2020 | Yang | B60L 58/20 |
| 2021/0129667 | A1 * | 5/2021 | Sugawara | B60K 17/3505 |

FOREIGN PATENT DOCUMENTS

| | | |
|---|---|---|
| JP | 2005-29162 A | 2/2005 |
| JP | 2015-182619 A | 10/2015 |

* cited by examiner

DRIVE CONTROL SYSTEM FOR HYBRID VEHICLE

CROSS REFERENCE TO RELATED APPLICATIONS

The present disclosure claims the benefit of Japanese Patent Application No. 2019-188436 filed on Oct. 15, 2019 with the Japanese Patent Office, the disclosures of which are incorporated herein by reference in its entirety.

BACKGROUND

Field of the Disclosure

Embodiments of the present disclosure relate to the art of a drive control system for a hybrid vehicle in which a prime mover includes an engine and a motor.

Discussion of the Related Art

JP-A-2015-182619 describes a control method for a hybrid vehicle in which a prime mover includes an engine and a motor. In the hybrid vehicle described in JP-A-2015-182619, torques of the engine and the motor are delivered to same pair of drive wheels. In the hybrid vehicle described in JP-A-2015-182619, specifically, an output shaft of the engine is connected to a geared transmission through an engine clutch, an output shaft of the motor is connected to the geared transmission through a motor clutch, and an output shaft of the geared transmission is connected to the drive wheels.

The hybrid vehicle described e.g., in JP-A-2015-182619 is powered by at least any one of the engine and the motor. According to the teachings of JP-A-2015-182619, the engine clutch is disengaged automatically and the hybrid vehicle is powered only by the motor in the event of engine stall. For example, determination of engine stall is made if an accelerator pedal or a shift lever is operated repeatedly within a predetermined period of time. When such abnormal operation of the accelerator pedal or shift lever is detected, the motor is allowed to propel the hybrid vehicle even if a state of charge level of a battery is lower than a predetermined level.

However, in the hybrid vehicle described in JP-A-2015-182619, the clutch and the geared transmission and so on are interposed between the motor and the drive wheels. Therefore, even if the motor is activated promptly upon detection of the above-mentioned abnormal operation, it will take some time until drive torque is delivered to the drive wheels. For this reason, if an operating mode is shifted from an engine mode to a motor mode in the situation that the vehicle is subjected to a large road load acting in an opposite direction to a traveling direction, e.g., when the vehicle travels on an uphill grade, or when front wheels drive over a bump, the vehicle may be moved backward by gravity due to such delay in transmission of the drive torque.

SUMMARY

Aspects of embodiments of the present disclosure have been conceived noting the foregoing technical problems, and it is therefore an object of the present disclosure to provide a drive control system for a hybrid vehicle configured to prevent backward coasting of such a vehicle on an uphill grade even when an engine torque cannot be delivered to drive wheels.

The drive control system according to the exemplary embodiment of the present disclosure is applied to a hybrid vehicle, comprising: an engine; a pair of first drive wheels to which torque of the engine is delivered; an engagement device that selectively interrupt torque transmission between the engine and the first drive wheels; and a motor connected to the first drive wheels or a pair of second drive wheels. The hybrid vehicle is propelled by torque generated by at least one of the engine and the motor. In order to achieve the above-explained objective, the drive control system according to the exemplary embodiment of the present disclosure is provided with a controller that controls at least the engine, the engagement device, and the motor. Specifically, the controller is configured to: determine an occurrence of a failure in which a required torque to establish a required drive force to propel the hybrid vehicle cannot be delivered from the engine to the first drive wheels, when the hybrid vehicle is propelled by delivering the torque from the engine to the first drive wheels on a road where a load to move the hybrid vehicle backward is applied to the hybrid vehicle; and execute a hill hold control to deliver the required torque from the motor to the second drive wheels while disengaging the engagement device, when an occurrence of the failure is determined.

In a non-limiting embodiment, the hybrid vehicle may further comprise: an electric storage device that supplies electric power to the motor; and a generator that translates an output power of the engine to an electric power to be delivered to the motor. In addition, the controller may be further configured to: determine whether an electric power required to generate the required torque by the motor can be supplied from the electric storage device to the motor; shift an operating mode to a battery mode in which the electric power is supplied from the electric storage device to the motor to generate torque by the motor, when the electric power required to generate the required torque by the motor can be supplied from the electric storage device to the motor; and shift the operating mode to a series mode in which the electric power is supplied from the generator to the motor to generate torque by the motor, when the electric power required to generate the required torque by the motor cannot be supplied from the electric storage device to the motor.

In a non-limiting embodiment, the hybrid vehicle may further comprise a transmission that is disposed between the motor and the second drive wheels to change the torque transmitted therebetween. In addition, the controller may be further configured to: determine whether the required torque can be generated by the motor; and execute downshifting to increase a speed ratio of the transmission when the required torque cannot be generated by the motor.

In a non-limiting embodiment, a maximum output torque of the motor may be constant when a rotational speed of the motor is lower than a predetermined speed, and the maximum output torque of the motor may decrease in reverse proportion to an increase in the speed of the motor from the predetermined speed.

In a non-limiting embodiment, the controller may be further configured to execute the downshifting of the transmission before generating the torque by the motor.

In a non-limiting embodiment, the speed ratio of the transmission may be changed even when the engine is stopped.

In a non-limiting embodiment, the failure may include engine stall.

In a non-limiting embodiment, the failure may include a failure in which the required torque cannot be delivered from the engine to the first drive wheels due to slippage of the engagement device.

In a non-limiting embodiment, the hybrid vehicle may further comprise another transmission that changes a speed ratio between the engine and the first drive wheels, and a predetermined speed ratio of another transmission may be established by engaging the engagement device.

In a non-limiting embodiment, the controller may be further configured to: determine whether a maximum power possible to be generated by the motor is equal to or greater than a required power to propel the hybrid vehicle, when the occurrence of the failure is determined; and apply brake force to at least any one of the pairs of the first drive wheels and the second drive wheels to stop the hybrid vehicle until the torque is delivered from the engine to the first drive wheels, when the maximum power possible to be generated by the motor is less than the required power.

In a non-limiting embodiment, the hybrid vehicle may further comprise a brake device that can apply the brake force to the at least any one of the pairs of the first drive wheels and the second drive wheels even when the engine stops.

Thus, according to the exemplary embodiment of the present disclosure, when the engine torque cannot be delivered to the first derive wheels due to stalling of the engine on e.g., an uphill grade, the torque generated by the motor is delivered to one of the pairs the first drive wheels and the second drive wheels. Since a response of the motor is quicker than that of the engine, the drive force can be delivered promptly to the drive wheels compared to a case of restarting the engine and delivering the engine torque to the first wheels. According to the exemplary embodiment of the present disclosure, therefore, backward coasting of the vehicle can be prevented even if the stalling of the engine occurs of e.g., the uphill grade.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
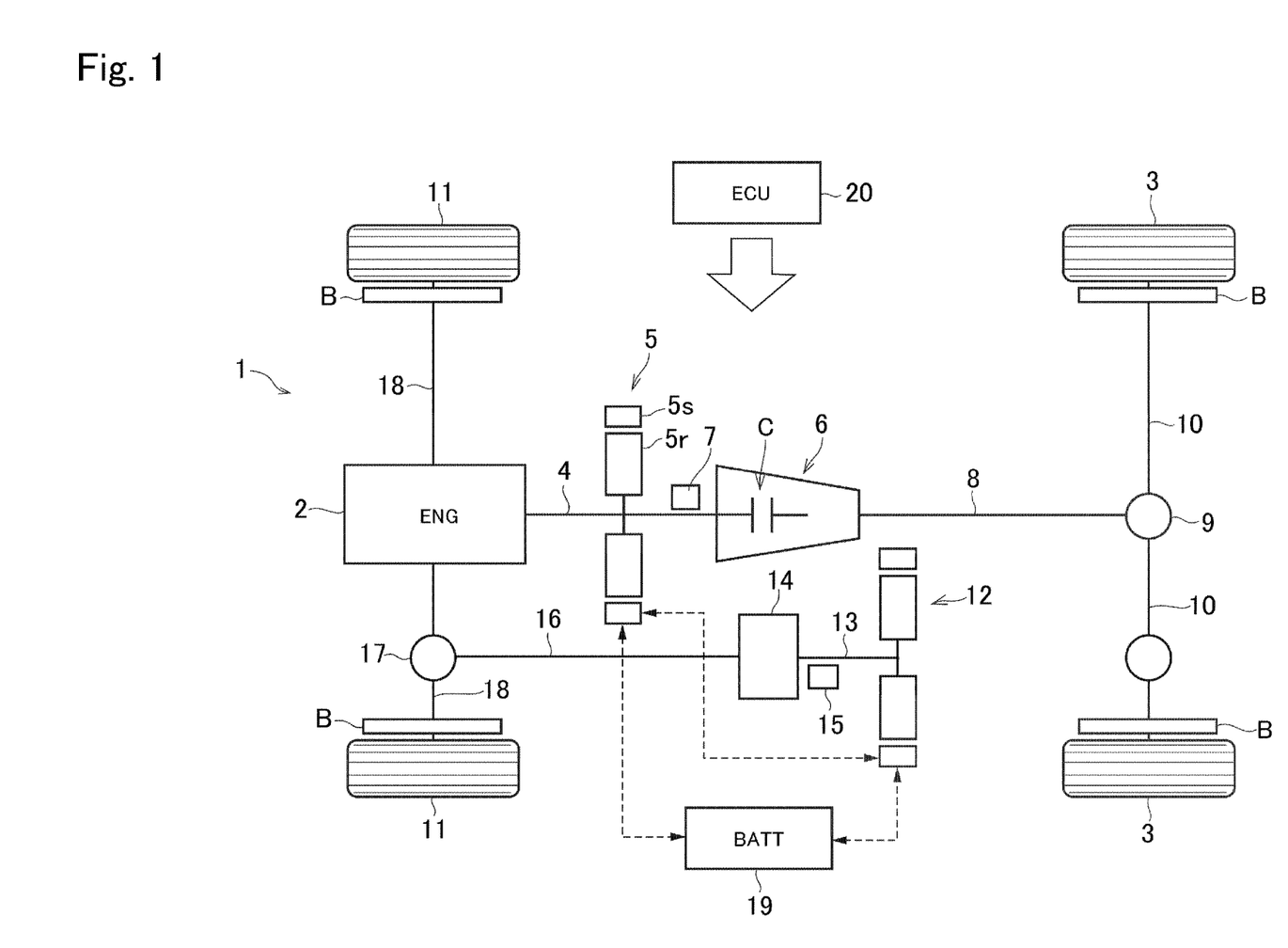
FIG. 1 is a schematic illustration showing one example of a structure of a hybrid vehicle to which the drive control system according to the embodiment of the present disclosure is applied.

Embodiments of the present disclosure will now be explained with reference to the accompanying drawings. Turning now to FIG. 1, there is shown a structure of a hybrid vehicle (as will be simply called the "vehicle" hereinafter) 1 to which the drive control system according to the embodiment of the present disclosure is applied. The vehicle 1 is a front-engine/rear-drive layout vehicle in which an engine (referred to as "ENG" in FIG. 1) 2 is arranged in a front section of the vehicle 1, and a power generated by the engine 2 is delivered to a pair of rear wheels 3 as "first wheels" of the embodiment.

The engine 2 is arranged in such a manner that an output shaft 4 thereof extends in a longitudinal direction of the vehicle 1, and an electricity-generating motor 5 is arranged on the output shaft 4 to be rotated integrally with the output shaft 4. For example, a permanent magnet synchronous motor may be adopted as the electricity-generating motor 5, and in the electricity-generating motor 5, a rotor 5r is fixed to the output shaft 4 and a stator 5s is connected to a stationary member such as a casing (not shown). In the vehicle 1, therefore, the power generated by the engine 2 may be translated partially into an electric power by energizing the electricity-generating motor 5 to reduce a rotational speed of the engine 2. Optionally, the electricity-generating motor 5 may have a function to generate a torque to assist a torque generated by the engine 2, and a function to crank the engine 2.

The output shaft 4 of the engine 2 further extends from the electricity-generating motor 5 to a rear section of the vehicle 1, and a leading end of the output shaft 4 is connected to a geared automatic transmission (as will be simply called the "transmission" hereinafter) 6 that changes a speed ratio stepwise. As conventional geared transmissions, the transmission 6 is provided with a plurality of clutch devices or brake devices (as will be simply called the "engagement device" hereinafter) C. In the transmission 6, a predetermined gear stage is established by engaging at least one of the engagement devices C so that the torque of the engine 2 is increased or decreased in accordance with a speed ratio of the gear stage. That is, torque transmission between the engine 2 and the rear wheels 3 is interrupted by disengaging the engagement device C. Here, only one of the engagement devices C is illustrated in FIG. 1 for the sake of illustration.

The engagement device C is actuated by a hydraulic actuator (not shown), and in order to establish hydraulic pressure of the hydraulic actuator, an oil pump 7 is disposed on the output shaft 4. Specifically, a mechanical oil pump is adopted as the oil pump 7, and the oil pump 7 is driven by the engine 2 to establish a hydraulic pressure.

The torque increased or decreased by the transmission 6 is delivered to the rear wheels 3 through a rear propeller shaft 8, a rear differential unit 9, and rear driveshafts 10.

In order to rotate a pair of front wheels 11 as "second drive wheels" of the embodiment, the vehicle 1 is provided with a drive motor 12 as a "motor" of the embodiment. Thus, the vehicle 1 is a four-wheel drive layout vehicle in which the rear wheels 3 are driven by the engine 2, and the front wheels 11 are driven by the drive motor 12. For example, a permanent magnet synchronous motor may also be adopted as the drive motor 12. That is, the drive motor 12 serves not only as a motor to generate a torque delivered to the front wheels 11 to propel the vehicle 1, but also as a generator to translate a kinetic energy of the vehicle 1 into an electric power by generating a torque in a direction to reduce a rotational speed of the front wheels 11.

In the vehicle 1 shown in FIG. 1, the drive motor 12 is arranged in a central or rear section of the vehicle 1 in such a manner that an output shaft 13 thereof extends toward the front section of the vehicle 1, and a leading end of the output shaft 13 is connected to an automatic transmission (as will be simply called the "transmission" hereinafter) 14. For example, a transmission in which a gear stage can be selected from three or more stages may be adopted as the transmission 14. Instead, the transmission 14 may also be a transmission in which a gear stage is selected from: a fixed stage in which a speed ratio is 1; and a speed reducing stage in which an input speed from the output shaft 13 is higher than an output speed from an after-mentioned front propeller shaft 16. Further, the transmission 14 may also be a continuously variable transmission in which a speed ratio is varied continuously.

The vehicle 1 shown in FIG. 1 is provided with an oil pump 15 so that a speed ratio of the transmission 14 is changed hydraulically by driving the oil pump 15 even when the engine 2 stops. Alternatively, an electromagnetic actuator may also be employed to change a speed ratio of the transmission 14.

The transmission 14 is connected to the front wheels 11 through the front propeller shaft 16, a front differential unit 17, and front driveshafts 18.

The electricity-generating motor 5 and the drive motor 12 are connected electrically with an electric storage device (referred to as "BATT" in FIG. 1) 19 so that electricity is supplied from the electric storage device 19 to those motors 5 and 12, and that electricity generated by those motors 5 and 12 is accumulated in the electric storage device 19. For example, a lithium ion battery, a capacitor, and an all-solid-state battery may be adopted as the electric storage device 19. The electricity-generating motor 5 and the drive motor 12 are also connected electrically with each other so that the electricity generated by one of the motors 5 and 12 is supplied to the other one of the motors 5 and 12. That is, an output power of the engine 2 may be translated partially into an electric power by the electricity-generating motor 5, and the electricity translated by the electricity-generating motor 5 may be supplied directly from the electricity-generating motor 5 to the drive motor 12.

In order to apply brake force to the vehicle 1 properly even when the engine 2 stops, each of the front wheels 11 and rear wheels 3 is individually provided with an electric brake (as will be simply called the "brake" hereinafter) B that generates brake force by e.g., an electromagnetic actuator.

An operating mode of the vehicle 1 may be selected from: an engine mode in which the vehicle 1 is propelled by delivering an output torque of the engine 2 to the rear wheels 3; an electric vehicle mode in which the vehicle 1 is propelled by delivering an output torque of the drive motor 12 to the front wheels 11; and a hybrid mode in which the vehicle 1 is propelled by delivering the output torque of the engine 2 to the rear wheels 3 while delivering the output torque of the drive motor 12 to the front wheels 11.

In the engine mode, the gear stage of the transmission 6 is determined with reference to a map determining the gear stage based on a speed of the vehicle 1 and a required drive force to propel the vehicle 1, and a predetermined engagement device C is engaged to establish the determined gear stage.

In the electric vehicle mode, a predetermined engagement device C is disengaged to bring the transmission 6 into a neutral stage. Specifically, the electric vehicle mode may be selected from: a battery mode in which an electric power required to propel the vehicle 1 is supplied from the electric storage device 19 to the drive motor 12; and a series mode in which an output power of the engine 2 is translated into an electric power by the electricity-generating motor 5, and the electric power translated by the electricity-generating motor 5 is supplied to the drive motor 12 to propel the vehicle 1. In the series mode, the required electric power to propel the vehicle 1 may also be supplied to the drive motor 12 from the electric storage device 19 at least partially.

In the hybrid mode, not only the electric power translated from a part of the output power of the engine 2 by the electricity-generating motor 5 but also the electric power accumulated in the electric storage device 19 may be supplied to the drive motor 12.

The engine 2, the electricity-generating motor 5, the drive motor 12, the engagement device C, the transmission 14 etc. are controlled by an electronic control unit (to be abbreviated as the "ECU" hereinafter) 20 as a controller. The ECU 20 comprises a microcomputer configured to execute a calculation based on incident data transmitted from various sensors as well as formulas and maps installed in advance. Calculation results are transmitted to the engine 2, the electricity-generating motor 5, the drive motor 12, the engagement device C, the transmission 14 etc. in the form of command signal.

For example, the ECU 20 receives data about: a speed of the vehicle 1 detected by a speed sensor including speeds of the wheels 11 and 3, and the propeller shafts 8 and 16; a speed of the engine 2 detected by an engine speed sensor; a position of an accelerator pedal detected by an accelerator sensor; a state of charge (to be abbreviated as "SOC" hereinafter) level of the electric storage device 19 detected by a battery sensor; and speeds of the electricity-generating motor 5 and the drive motor 12 detected by a motor speed sensor (neither of which are shown).

The maps installed in the ECU 20 include: a map determining a required drive force to propel the vehicle 1 based on a position of the accelerator pedal and a speed of the vehicle 1; and a map determining a gear stage of the transmission 6 based on a position of the accelerator pedal and a speed of the vehicle 1.

The ECU 20 determines an intake air, a fuel injection, and an ignition timing of the engine 2 based on the incident data with reference to the map, and transmits command signals to devices controlling those factors. Likewise, the ECU 20 determines values and frequencies of currents applied to the electricity-generating motor 5 and the drive motor 12 based on the incident data with reference to the map, and transmits command signals to the inverter. Further, the ECU 20 determines gear stages or speed ratios of the transmissions 6 and 14 based on the incident data with reference to the map, and transmits command signals to actuators of the transmissions 6 and 14.

If the engine 2 stalls or the engagement device C slips during propulsion in the engine mode or the hybrid mode, a torque to establish the required drive force to propel the vehicle 1 may not be delivered from the engine 2 to the rear wheels 3. If such failure occurs when the vehicle 1 travels on an uphill grade or drives over a bump, a load to roll the vehicle 1 backward may overwhelm a load to propel the vehicle 1 (i.e., the drive force), and consequently, the vehicle 1 may be moved backward undesirably. In order to prevent such backward coasting of the vehicle 1 in the event of the above-explained failures on e.g. an uphill grade, the drive control system according to the exemplary embodiment of the present disclosure is configured to shift the operating mode of the vehicle 1 to the electric vehicle mode.

Figure 2:
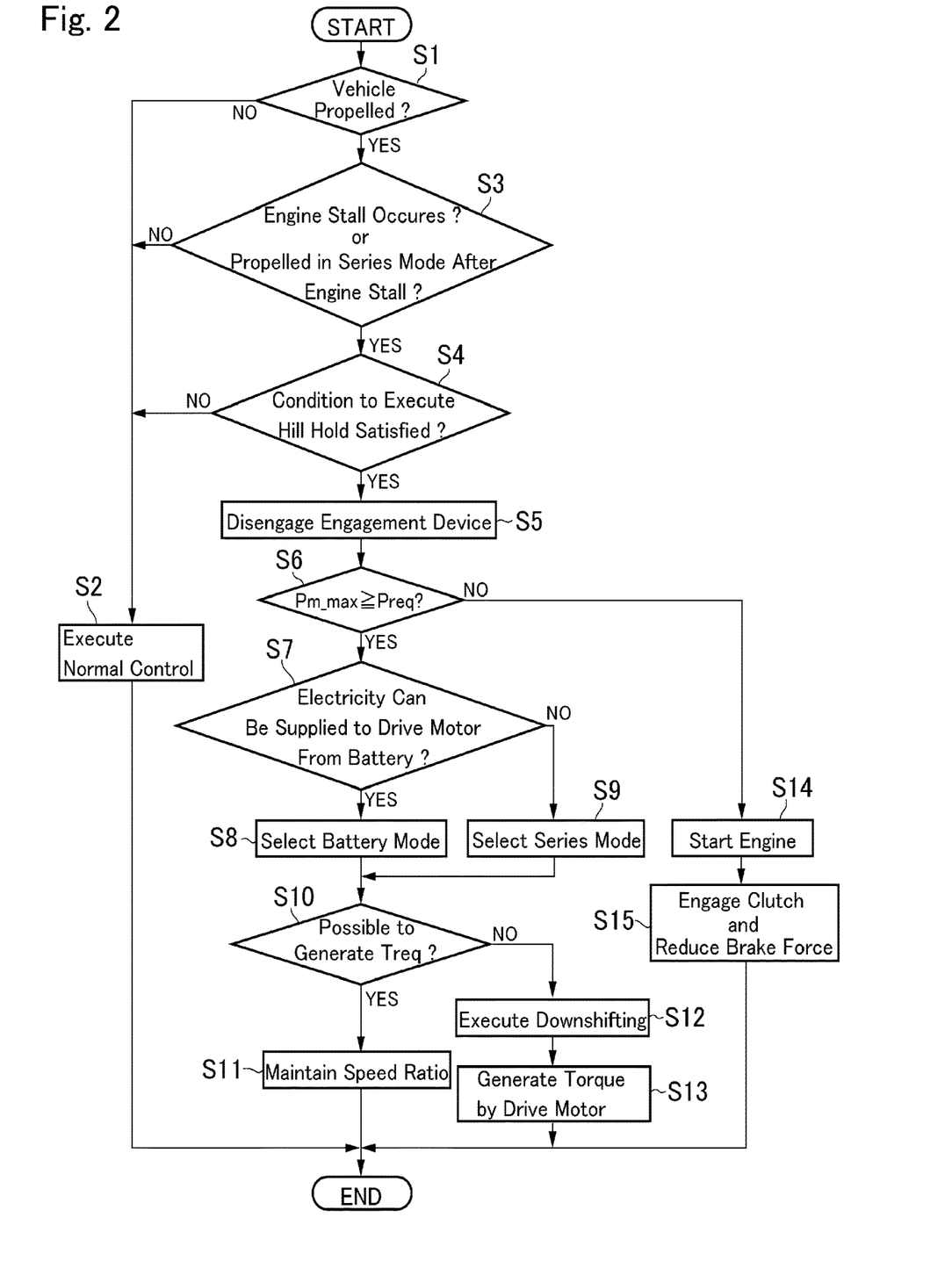
FIG. 2 is a flowchart showing one example of a routine executed by the drive control system according to the embodiment of the present disclosure.

Specifically, the drive control system according to the exemplary embodiment of the present disclosure is configured to execute a routine shown in FIG. 2. At step S1, it is determined whether the vehicle 1 is being propelled. As described, the drive control system according to the exemplary embodiment of the present disclosure is configured to prevent unintentional backward coasting of the vehicle 1. That is, if the vehicle 1 is stopped, this means that a brake force is applied sufficiently to the vehicle 1. Therefore, it is determined at step S1 whether a speed of the vehicle 1 detected by the vehicle speed sensor is higher than a predetermined level. However, the vehicle 1 may also be stopped on the uphill grade when the drive force to propel the vehicle 1 in the forward direction and the load to move the vehicle 1 backward balance each other. Therefore, such determination at step S1 may also be made based on a fact that the accelerator pedal is depressed deeper than a predetermined position. In other words, the determination at step S1 may also be made based on a fact that a driver intends to propel the vehicle.

If the vehicle 1 is propelled so that the answer of step S1 is NO, the routine progresses to step S2 to control the vehicle 1 by a normal control, and thereafter returns. In this case, when the accelerator pedal is depressed to propel the vehicle 1 being stopped, the operating mode of the vehicle 1 is selected from the above-mentioned modes in such a manner as to achieve the required drive force governed by a position of the accelerator pedal.

By contrast, if the vehicle 1 is being propelled so that the answer of step S1 is YES, the routine progresses to step S3 to determine whether stalling of the engine 2 is occurring, or the vehicle 1 is being propelled in the series mode by restarting the engine 2 after the occurrence of engine stall. That is, at step S3, it is determined whether the torque can be delivered from the engine 2 to the rear wheels 3 so as to achieve the required drive force to propel the vehicle 1. Therefore, in order to determine the feasibility of delivering the torque from the engine 2 to the rear wheels 3, it is also possible to determine whether the engagement device C is slipping. For example, an occurrence of engine stall may be determined based on an ignition timing and a detection value of a knock sensor (not shown).

As will be explained later, the series mode will be selected at below-mentioned step S9. In the series mode, the power generated by the engine 2 is translated into the electric power to be supplied to the drive motor 12 to propel the vehicle 1, and the series mode is selected not only in the event of engine stall but also in accordance with the required drive force, the vehicle speed, the SOC level and so on, even when the engine 2, the motors 5, 12, the engagement device C etc. function properly. At step S3, therefore, it is determined whether the vehicle 1 is propelled in the series mode by restarting the engine 2 after the occurrence of engine stall.

If stalling of the engine 2 is not occurring, or if the vehicle 1 is not being propelled in the series mode by restarting the engine 2 after the occurrence of engine stall so that the answer of step S3 is NO, the routine also progresses to step S2 to control the vehicle 1 by a normal control, and thereafter returns.

By contrast, if stalling of the engine 2 is occurring, or if the vehicle 1 is being propelled in the series mode by restarting the engine 2 after the occurrence of engine stall so that the answer of step S3 is YES, the routine progresses to step S4 to determine whether a condition to execute a hill hold control to prevent the unintentional backward coasting of the vehicle 1 is satisfied. In other words, it is determined at step S4 whether a flag to execute the hill hold control is on. For example, the hill hold control is executed when the vehicle 1 travels on an uphill grade, when the vehicle 1 drives over a bump, or when the vehicle 1 drives on an unpaved road covered with rocks and stones. According to the exemplary embodiment of the present disclosure, satisfaction of the condition to execute the hill hold control may be determined based on a detection value of a pitching sensor (not shown). Instead, if the vehicle 1 is provided with an on-board camera for recording the external view around the vehicle 1, satisfaction of the condition to execute the hill hold control may also be made by analyzing data recorded by the on-board camera.

For example, the vehicle 1 is not subjected to the load to move the vehicle 1 backward on a substantially flat road, and hence the condition to execute the hill hold control will not be satisfied when the vehicle 1 drives on the flat road. If the condition to execute the hill hold control is not satisfied so that the answer of step S4 is NO, the routine also progresses to step S2 to propel the vehicle 1 by a normal control. Specifically, in a case that engine stall is occurring but the condition to execute the hill hold control is not satisfied, the transmission 6 is brought into the neutral stage by disengaging the engagement device C and the engine 2 is cranked by the electricity-generating motor 5. Otherwise, the engine 2 is cranked by a torque delivered from the rear wheels 3 while engaging the engagement device C. Thereafter, the vehicle 1 is propelled in a normal manner. In this case, since the vehicle 1 is travelling on e.g., the flat road, the vehicle 1 will not be moved backward even if it takes some time to deliver the drive force to the rear wheels 3 by restarting the engine 2 after the occurrence of engine stall.

Specifically, in the case that the vehicle 1 is propelled in the series mode by restarting the engine 2 after the occurrence of engine stall and the condition to execute the hill hold control is not satisfied, the vehicle 1 is propelled in the operating mode selected in accordance with a vehicle speed and a required drive force. In the case that the answer of step S4 is NO, flag to execute the hill hold control is turned off.

By contrast, if the condition to execute the hill hold control is satisfied so that the answer of step S4 is YES, the routine progresses to step S5. At step S5, in order to reduce a resistance of the engine 2 for the preparation of propelling the vehicle 1 in the electric vehicle mode at subsequent steps, or to restart the engine 2 at subsequent step, the engagement device C is disengaged to bring the transmission 6 into the neutral stage.

Then, it is determined at step S6 whether a maximum power Pm_max possible to be generated by the drive motor 12 is equal to or greater than a required power Preq to propel the vehicle 1. Specifically, the required power Preq to propel the vehicle 1 may be calculated by multiplying a required drive force governed by a position of the accelerator pedal by a speed of the vehicle 1. On the other hand, the maximum power Pm_max of the drive motor 12 is governed by specifications of the drive motor 12. That is, at step S6, it is determined whether the required power Preq to propel the vehicle 1 can be generated only by the drive motor 12.

If the maximum power Pm_max of the drive motor 12 is equal to or greater than the required power Preq to propel the vehicle 1 so that the answer of step S6 is YES, the routine progresses to step S7 to determine whether the electric power can be supplied to the drive motor from the electric storage device 19. For example, such determination at step S7 may be made based on whether a temperature in the electric storage device 19 is higher than a predetermined level to restrict an output power of the electric storage device 19. Here, even if the output power of the electric storage device 19 is restricted to a certain extent, the answer of step S7 will be YES if electric power possible to generate the required power Preq can be supplied to the drive motor 12 from the electric storage device 19.

If the electric power possible to generate the required power Preq can be supplied to the drive motor 12 from the electric storage device 19 so that the answer of step S7 is YES, the routine progresses to step S8 to select the battery mode. By contrast, if the electric power possible to generate the required power Preq cannot be supplied to the drive motor 12 from the electric storage device 19 so that the answer of step S7 is NO, the routine progresses to step S9 to select the series mode. That is, a prime mover to propel the vehicle 1 in the electric vehicle mode is selected at step S7 from the electric storage device 19 and the engine 2. The control to generate the drive force while shifting the operating mode to the battery mode at step S8 or to the series mode at step S9 corresponds to the hill hold control according to the exemplary embodiment of the present disclosure.

The maximum output torque of the drive motor 12 is constant as long as a rotational speed of the drive motor 12 is lower than the base speed, and the maximum output torque of the drive motor 12 decreases in reverse proportion to an increase in the speed of the drive motor 12 from the base speed. Therefore, given that the rotational speed of the drive motor 12 is lower than the base speed, the drive motor 12 may not generate a maximum power PM_max thereof. For example, in a case that a speed ratio of the transmission 14 is relatively small, the rotational speed of the drive motor 12 is reduced lower than a speed of the vehicle 1. In this case, therefore, the drive motor 12 may not generate a torque Treq possible to establish the required drive force to propel the vehicle 1 (hereinafter referred to as the "required torque") even if the maximum power PM_max of the drive motor 12 is greater than the required power Preq.

Figure 3:
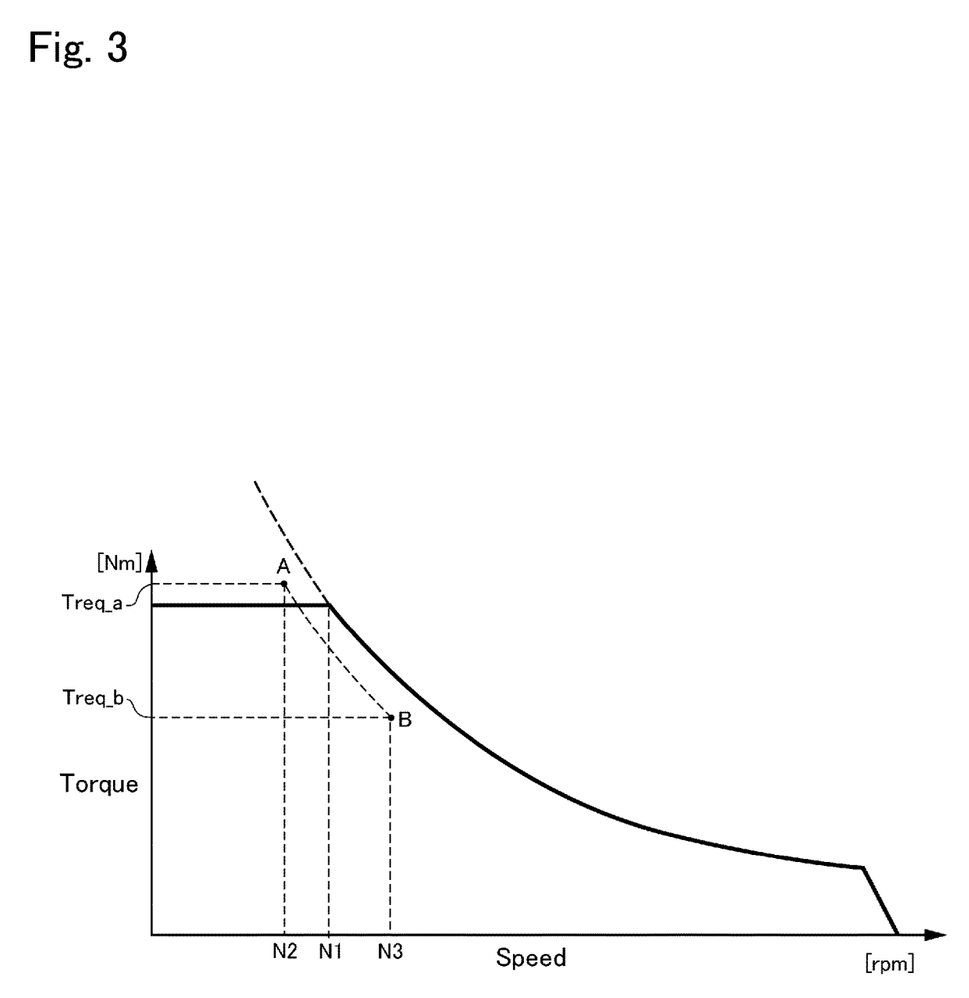
FIG. 3 is a graph showing specifications of a drive motor.

A relation between the rotational speed and the maximum torque of the drive motor 12 is indicated in FIG. 3. As can be seen from FIG. 3, given that torque Treq_a is required when the drive motor 12 is rotated at a predetermined speed N2 which is lower than the base speed, the drive motor 12 may not generate the required torque Treq_a even if the electric power can be supplied sufficiently to the drive motor 12. By contrast, given that the required power Preq to propel the vehicle 1 is constant and that the rotational speed of the drive motor 12 is increased to another predetermined speed N3 which is higher than the base speed N1, the required torque is reduced to torque Treq_b with such reduction in the speed of the drive motor 12. In this case, since the drive motor 12 is rotated at the speed N3 which is higher than the base speed N1, the drive motor 12 is allowed to generate the maximum power PM_max. Thus, the required torque Treq_b can be generated by the drive motor 12 by increasing the speed of the drive motor 12 higher than the base speed N1.

At step S10, therefore, it is determined whether the required torque Treq can be generated in the current gear stage of the transmission 14 and in the operating mode selected at step S8 or S9. If the required torque Treq can be generated in the current gear stage of the transmission 14 so that the answer of step S10 is YES, the routine progresses to step S11 to maintain the current speed ratio, and thereafter returns.

By contrast, if the required torque Treq cannot be generated in the current gear stage of the transmission 14 so that the answer of step S10 is NO, the speed ratio of the transmission 14 is increased to increase the output power by increasing the rotational speed of the drive motor 12. That is, a downshifting is executed. However, if the downshifting is executed while generating the torque by the drive motor 12, the torque may be reduced during transitional state of the downshifting and hence the vehicle 1 may be moved backward. In addition, an engagement shock of the engagement device C may be caused, and gears may be damaged by a collision load.

In this case, therefore, the routine progresses to step S12 to execute the downshifting first, and further progresses to step S13 to generate torque by the drive motor 12. Thereafter, the routine returns.

However, if the torque is thus generated by the drive motor 12 after executing the downshifting of the transmission 14, the vehicle 1 may be moved backward after the occurrence of the engine stall until the torque is delivered from the drive motor 12 to the front wheels 11. In order to prevent such backward coasting of the vehicle 1, optionally, it may be determined whether the speed of the vehicle 1 is low enough to cause such a backward coasting before step S12. In this case, the routine may progress to step S2 if the speed of the vehicle 1 is not low enough to cause backward coasting, and to after-mentioned step S14 if the speed of the vehicle 1 is low enough to cause backward coasting.

Otherwise, if the maximum power Pm_max of the drive motor 12 is less than the required power Preq to propel the vehicle 1 so that the answer of step S6 is NO, the vehicle 1 may be moved backward due to lack of drive force. In this case, therefore, the operating mode is shifted to the hybrid mode or engine mode. Specifically, at step S14, the engine 2 is started by cranking the engine 2 by the electricity-generating motor 5 while disengaging the engagement device C, and power supply to the drive motor 12 is stopped. In this situation, in order to prevent backward coasting of the vehicle 1, the vehicle 1 is stopped by a brake force applied from the brake B.

Then, the engagement device C is engaged and the brake force of the brake B is reduced at step S15, and thereafter the routine returns.

Thus, when the torque to establish the required drive force cannot be delivered from the engine 2 to the rear wheels 3 due to engine stall on an uphill grade, the drive motor 12 delivers the torque to the front wheels 11. According to the exemplary embodiment of the present disclosure, therefore, the torque can be delivered promptly to the drive wheels to establish the required drive force thereby preventing backward coasting as might be caused by a temporal reduction in the drive force.

In the case that the electric power corresponding to the required torque cannot be supplied from the electric storage device 19 to the drive motor, the operating mode of the vehicle 1 is shifted to the series mode. According to the exemplary embodiment of the present disclosure, therefore, the drive force to establish the drive force to propel the vehicle 1 may be established promptly compared to the case of shifting the operating mode to the engine mode by restarting the engine 2 while engaging the engagement device C. For this reason, backward coasting due to a temporal reduction in the drive force may be prevented.

In the case that the rotational speed of the drive motor 12 is low and hence the drive motor may not generate the required torque, downshifting of the transmission is carried out so that the drive motor 12 is allowed to generate the maximum power thereby preventing lack of drive force. In addition, by thus executing the downshifting before generating torque by the drive motor 12, a temporal torque drop as might be caused by a shifting operation of the transmission 14 can be prevented. Further, an engagement shock of the engagement device C, and a damage on gears by a collision load may be reduced.

Furthermore, rotational speed of the drive motor 12 can be changed more quickly and accurately compared to the engine 2. That is, a required time to change a speed ratio of the transmission 14 is shorter than a required time to change a speed of the engine 2 by engaging the engagement device C of the transmission 6. Therefore, the drive force to propel the vehicle 1 can be established quickly by delivering the torque from the drive motor 12 to the front wheels 11 through the transmission 14 so as to prevent backward coasting of the vehicle 1.

Although the above exemplary embodiments of the present disclosure have been described, it will be understood by those skilled in the art that the present disclosure should not be limited to the described exemplary embodiments, and various changes and modifications can be made within the scope of the present disclosure. For example, a belt-driven continuously variable transmission that is not provided with the engagement device may also be adopted as the transmission 6. In this case, the engagement device may be arranged on an input side or an output side of the transmission 6 to interrupt torque transmission between the engine 2 and the rear wheels 3. In addition, the drive control system according to the exemplary embodiment of the present disclosure may also be applied to a two-wheel layout vehicle in which the torque of the drive motor 12 is delivered to the rear propeller shaft 8. Furthermore, the transmission 14 arranged between the drive motor 12 and the front wheels 11 may be omitted. In this case, the torque of the drive motor 12 may be delivered promptly to the front wheels 11.

What is claimed is:

1. A drive control system for a hybrid vehicle, comprising:
an engine;
a pair of first drive wheels to which torque of the engine is delivered;
an engagement device that selectively interrupt torque transmission between the engine and the first drive wheels; and
a motor connected to a pair of second drive wheels,
wherein the hybrid vehicle is propelled by torque generated by at least one of the engine and the motor,
the drive control system comprising:
a controller that controls at least the engine, the engagement device, and the motor,
wherein the controller is configured to
determine an occurrence of a failure in which a required torque to establish a required drive force to propel the hybrid vehicle cannot be delivered from the engine to the first drive wheels, when the hybrid vehicle is propelled by delivering the torque from the engine to the first drive wheels on a road where a load to move the hybrid vehicle backward is applied to the hybrid vehicle,
execute a hill hold control to deliver the required torque from the motor to the second drive wheels while disengaging the engagement device, when an occurrence of the failure is determined,
determine whether a maximum power possible to be generated by the motor is equal to or greater than a required power to propel the hybrid vehicle, when the occurrence of the failure is determined, and
apply brake force to at least any one of the pairs of the first drive wheels and the second drive wheels to stop the hybrid vehicle until the torque is delivered from the engine to the first drive wheels, when the maximum power possible to be generated by the motor is less than the required power.

2. The drive control system for the hybrid vehicle as claimed in claim 1,
wherein the hybrid vehicle further comprises:
an electric storage device that supplies electric power to the motor; and
a generator that translates an output power of the engine to an electric power to be delivered to the motor, and
the controller is further configured to
determine whether an electric power required to generate the required torque by the motor can be supplied from the electric storage device to the motor,
shift an operating mode to a battery mode in which the electric power is supplied from the electric storage device to the motor to generate torque by the motor, when the electric power required to generate the required torque by the motor can be supplied from the electric storage device to the motor, and
shift the operating mode to a series mode in which the electric power is supplied from the generator to the motor to generate torque by the motor, when the electric power required to generate the required torque by the motor cannot be supplied from the electric storage device to the motor.

3. The drive control system for the hybrid vehicle as claimed in claim 1,
wherein the hybrid vehicle further comprises a transmission that is disposed between the motor and the second drive wheels to change the torque transmitted therebetween, and
the controller is further configured to
determine whether the required torque can be generated by the motor, and
execute downshifting to increase a speed ratio of the transmission when the required torque cannot be generated by the motor.

4. The drive control system for the hybrid vehicle as claimed in claim 3,
wherein a maximum output torque of the motor is constant when a rotational speed of the motor is lower than a predetermined speed, and
the maximum output torque of the motor decreases in reverse proportion to an increase in the speed of the motor from the predetermined speed.

5. The drive control system for the hybrid vehicle as claimed in claim 3, wherein the controller is further configured to execute the downshifting of the transmission before generating the torque by the motor.

6. The drive control system for the hybrid vehicle as claimed in claim 3, wherein the speed ratio of the transmission can be changed even when the engine is stopped.

7. The drive control system for the hybrid vehicle as claimed in claim 1, wherein the failure includes engine stall.

8. The drive control system for the hybrid vehicle as claimed in claim 1, wherein the failure includes a failure in which the required torque cannot be delivered from the engine to the first drive wheels due to slippage of the engagement device.

9. The drive control system for the hybrid vehicle as claimed in claim 8,
wherein the hybrid vehicle further comprises another transmission that changes a speed ratio between the engine and the first drive wheels, and
a predetermined speed ratio of another transmission is established by engaging the engagement device.

10. The drive control system for the hybrid vehicle as claimed in claim 1, wherein the hybrid vehicle further comprises a brake device that can apply the brake force to the at least any one of the pairs of the first drive wheels and the second drive wheels even when the engine stops.

* * * * *